United States Patent
Hinnen et al.

(10) Patent No.: US 9,648,308 B2
(45) Date of Patent: May 9, 2017

(54) MULTIPLE VIEWER 3D DISPLAY

(71) Applicant: KONINKLIJKE PHILIPS N.V., Eindhoven (NL)

(72) Inventors: Karel Johannes Gerhardus Hinnen, Eindhoven (NL); Erno Hermanus Antonius Langendijk, Eindhoven (NL); Christiaan Varekamp, Veldhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 215 days.

(21) Appl. No.: 14/388,045

(22) PCT Filed: Mar. 19, 2013

(86) PCT No.: PCT/IB2013/052161
§ 371 (c)(1),
(2) Date: Sep. 25, 2014

(87) PCT Pub. No.: WO2013/144773
PCT Pub. Date: Oct. 3, 2013

(65) Prior Publication Data
US 2015/0049176 A1    Feb. 19, 2015

Related U.S. Application Data

(60) Provisional application No. 61/615,947, filed on Mar. 27, 2012.

(51) Int. Cl.
*H04N 13/00* (2006.01)
*H04N 13/04* (2006.01)

(52) U.S. Cl.
CPC ....... *H04N 13/0404* (2013.01); *H04N 13/007* (2013.01); *H04N 13/045* (2013.01);
(Continued)

(58) Field of Classification Search
None
See application file for complete search history.

(56) References Cited

U.S. PATENT DOCUMENTS 5,959,664 A * 9/1999 Woodgate .......... G02B 27/0093
                                                              348/51
6,055,013 A * 4/2000 Woodgate .......... G02B 27/0093
                                                              348/59
(Continued)

FOREIGN PATENT DOCUMENTS

JP        A1042315       2/1998
JP      2008170841 A     7/2008
(Continued)

OTHER PUBLICATIONS

Holliamn N., "3D Display Systems". Department of Computer Science, University of Durham, Science Laboratories, South Road, Durham, DH1 3LE, Feb. 2, 2005.
(Continued)

*Primary Examiner* — Reza Aghevli
(74) *Attorney, Agent, or Firm* — Larry Liberchuk

(57) ABSTRACT

A display device (120) has a 3D display (160) for emitting at least two views of 3D image data to enable autostereoscopic viewing of 3D image data at multiple viewing positions (182, 184). A processor (140) processes the 3D image data (122) for generating the views for display on the 3D display, and a viewer detector (130) detects a viewer position of a viewer in front of the 3D display. The processor has a viewer conflict detector (141) for detecting and resolving viewer position conflicts. The detector obtains at least a first viewer position of a first viewer via the viewer detector, and detects a viewer position conflict at the first viewer position where said first view and second view do not provide the 3D effect for the first viewer. If so, the detector controls generating the views in dependence of the detected (Continued)

viewer position conflict. At least one of said at least two views as received by the first viewer is dynamically modified to signal or resolve the conflict.

17 Claims, 8 Drawing Sheets

(52) U.S. Cl.
CPC ....... *H04N 13/047* (2013.01); *H04N 13/0409* (2013.01); *H04N 13/0418* (2013.01); *H04N 13/0447* (2013.01); *H04N 13/0454* (2013.01); *H04N 13/0477* (2013.01); *H04N 13/0497* (2013.01); *H04N 13/0475* (2013.01)

(56) References Cited

U.S. PATENT DOCUMENTS

| | | |
|---|---|---|
| 7,843,449 B2 | 11/2010 | Krah |
| 2003/0039031 A1 | 2/2003 | Redert |
| 2004/0252187 A1 | 12/2004 | Alden |
| 2010/0002079 A1 | 1/2010 | Krijn |
| 2010/0194857 A1* | 8/2010 | Mentz ................ G02B 27/2264 348/43 |
| 2011/0316987 A1* | 12/2011 | Komoriya .......... G06K 9/00228 348/51 |
| 2012/0038745 A1* | 2/2012 | Yu ..................... H04N 13/0022 348/46 |
| 2012/0154384 A1 | 6/2012 | Yamada |
| 2012/0154554 A1 | 6/2012 | Ootuki |
| 2012/0300046 A1* | 11/2012 | Blayvas ............. G02B 27/0093 348/54 |
| 2013/0093752 A1* | 4/2013 | Yuan .................... H04N 13/047 345/419 |
| 2013/0113786 A1* | 5/2013 | King .................. H04N 13/0472 345/419 |
| 2014/0036047 A1* | 2/2014 | Watanabe .......... G02B 27/2214 348/54 |
| 2015/0077321 A1 | 3/2015 | Varekamp |

FOREIGN PATENT DOCUMENTS

| | | |
|---|---|---|
| WO | WO9723097 A2 | 6/1997 |
| WO | WO2010091113 A2 | 8/2010 |

OTHER PUBLICATIONS

Travis A. et al., "The Design of Backlights for View-Sequential 3D", Microsoft Corporation, http://download.microsoft.com/download/D/2/E/D2E425F8-CF3C-4C71-A4A2-70F9D4081007/Backlightforviewsequentialautostereo.docx.

Stolle H. et al., "Technical Solutions for a Full-Resolution Auto-Stereoscopic 2D/3D Display Technology", Conference Proceedings vol. 6803 Stereoscopic Displays and Applications XIX, Copyright 2008 Society of Photo-Optical Instrumentation Engineers, SeeReal Technologies GmbH (Germany) http://www.seereal.biz/en/autostereoscopy/papers/E108%206803-24%20Web.pdf.

Matsumoto S. et al., "Real-Time Measurement of a Viewer's Position to Evaluate a Stereoscopic LED Display with a Parallax Barrier", IEICE Transactions on Electronics, vol. E87-C, No. 11, Nov. 2004. pp. 1982-1988.

\* cited by examiner

MULTIPLE VIEWER 3D DISPLAY

FIELD OF THE INVENTION

The invention relates to a device and method for processing three-dimensional [3D] image data. The invention further relates to a display device comprising a 3D display for emitting at least two views of 3D image data, the views enabling autostereoscopic viewing of the 3D image data at multiple viewing positions by a viewer perceiving a first view of said at least two views via the left eye and a second view of said at least two views via the right eye to provide a 3D effect, a processor for processing the 3D image data for generating the at least two views for display on the 3D display, and a viewer detector for detecting a viewer position of a viewer in front of the 3D display.

3D displays, and in particular televisions equipped with 3D displays, are increasingly popular amongst consumers, as they provide a viewer with stereoscopic perception of depth. Usually goggles are required, but viewers tend to prefer systems without additional eyewear. For that purpose, so-termed autostereoscopic 3D displays comprise optical components, e.g., a lenticular lens array or directional beams, for providing at least a left view and a right view of a scene. This enables the viewer to see a different image with each eye when positioned correctly.

BACKGROUND OF THE INVENTION

Certain autostereoscopic displays, sometimes referred to as automultiscopic displays, provide multiple views of the same scene, rather than only a left and a right view. This allows the viewer to assume multiple positions in the viewing cone, i.e., move left-right in front of the display, while still obtaining a stereoscopic perception of the scene.

However, not all positions assumed by the viewer are equally suitable for obtaining stereoscopic perception of the scene. In particular, when the display is arranged for repeating the viewing cone as a series of viewing cones, a viewer may be positioned such that, e.g., the left eye perceives an outermost right-hand view of a given viewing cone, and the right eye perceives an outermost left-hand view of an adjacent viewing cone. There the viewer is positioned at a cone transition. At such a viewing position, a viewer obtains a so-termed pseudoscopic perception of the scene, in which the scene often appears to have a depth, yet which is incorrect. Pseudoscopic perception is known to cause headaches and other symptoms of visual strain.

Despite the aforementioned visual strain caused by pseudoscopic perception, it is not always obvious to the viewer that he is positioned at a pseudoscopic viewing position.

U.S. Pat. No. 6,055,013 discloses an autostereoscopic display providing four views in each lobe, i.e., in each viewing cone. It is said that an observer has a wide range of viewing freedom with pseudoscopic viewing positions being present at the boundaries between adjacent lobes. A technique is illustrated for providing an observer with a visual indication of the pseudoscopic positions. For that purpose, a parallax optic is arranged for providing an indication in a central lobe that is dark whereas the indication in adjacent lobes is bright. The next lobes are then again dark, and so on. Thus, at pseudoscopic viewing positions, at least one eye of the observer sees a non-black position indication. The technique of U.S. Pat. No. 6,055,013 thus allows an observer to distinguish between desired stereoscopic viewing positions and undesirable pseudoscopic viewing positions.

US 2004/0252187 describes a front projection display that is able to segment the viewer space into segments by using time sequential multiplexing. Each of the segments receives a different full resolution image stream. The system combines a pixel generation mechanism with an array of rotating micro mirrors that sweeps the pixels through the user space to provide an operation mode for autostereoscopic 3D. The system has a viewer detector that determines the positions of the users relative to the screen, the positions being achieved with head tracking. The positional data is used to render customized views for each specific user. Hence the system produces a number of sequential view perspectives based on the position of users relative to the screen. In addition a "fall-back" scenario is described for the case that no users are identified.

SUMMARY OF THE INVENTION

A problem of the above technique is that it is unsuitable to provide multiple views for viewers at arbitrary viewing positions.

It is an object of the invention to provide a display device as described in the opening paragraph, wherein the device further comprises a viewer conflict detector arranged for obtaining at least a first viewer position of a first viewer via the viewer detector, detecting a viewer position conflict at the first viewer position where said first view and second view do not provide the 3D effect for the first viewer, and controlling generating the views in dependence of the detected viewer position conflict by modifying at least one of said at least two views as received by the first viewer.

The viewer conflict detector uses the viewer detector to detect at least one viewer in front of the display. Subsequently, the viewer conflict detector determines whether, at the viewer position, the views that are provided to the viewer do provide a correct 3D effect. Whenever the viewer conflict detector determines that the required 3D effect is not provided, the viewer conflict detector instructs the processor to modify at least one of the views that are received by the first viewer. For example, a warning can be dynamically inserted in one view that is perceived by said first viewer. Advantageously, the viewer conflict detector determines that one or more viewers are present at respective positions, and further determines whether each of the viewers perceives the 3D effect. If not, the viewer conflict detector selectively modifies at least one of the views, for example to indicate to the respective viewer that he does not receive the 3D effect or to provide a correct 2D effect instead of a pseudoscopic effect.

Optionally, the processor is arranged for said modifying by changing at least one of said at least two views for indicating that the 3D effect is not provided. This has the effect that other viewers, which receive only another one of said at least two views, are not bothered by said modifying.

Optionally, the 3D display is a multiple view display arranged for adjacently emitting, in a viewing cone, a series of more than two views of the 3D image data, the series of views enabling autostereoscopic viewing of the 3D image data at multiple viewing positions in the viewing cone, and wherein the viewer conflict detector is arranged for detecting a viewer position cone conflict at the first viewer position where said first view is a first cone view from a first cone and the second view is a second cone view from a second cone. It is noted that such a viewing cone is usually adjacent to a further viewing cone due to the mechanism of generating said cones, e.g. said lenticular lens array. On the boundary a viewer perceives the pseudoscopic effect, when said first view is a first cone view from a first cone and the second view is a second cone view from a second cone. Advantageously the device detects that the user is at such position, and modifies the views.

Optionally, the viewer conflict detector is arranged for, when detecting the viewer position cone conflict, controlling the processor to modify at least one of the first cone view and second cone view by at least one of
- overlaying a graphical element on the respective cone view;
- overlaying a text message on the respective cone view;
- invert the respective cone view;
- changing image content of the respective cone view.

Advantageously, the above modifications provide practical ways of indicating to the viewer that he is at a conflict position, where the 3D effect is not correctly provided.

Optionally, the viewer conflict detector is arranged for, when detecting the viewer position cone conflict, controlling the processor to modify at least one of the first cone view and second cone view by providing the same image content to both the first cone view and second cone view to generate a 2D effect for the viewer. Advantageously, the viewer that has the viewer position cone conflict does no longer perceive the pseudoscopic effect, but a 2D effect. The lack of the 3D effect may just be acceptable for said viewer, or he may move to a different position.

Optionally, the viewer conflict detector is arranged for, when detecting the viewer position cone conflict, controlling the processor to modify at least one of the first cone view and second cone view by at least one of
- changing brightness of the respective cone view;
- changing color of the respective cone view.

Advantageously such a change is clearly visible to the viewer at the conflict position.

Optionally, the viewer conflict detector is arranged for
- obtaining at least a second viewer position of a second viewer via the viewer detector,
and for, when detecting the viewer cone position conflict,
- selecting one of the first cone view and second cone view such that the selected cone view is not a view perceived by the second viewer,
- controlling the processor to modify only the selected cone view.

Advantageously, the second viewer is not affected by said modifying the views.

Optionally, the 3D display is a sequential view display arranged for consecutively emitting a left view and a right view via a respective first directional beam to the left eye and a respective second directional beam to the right eye of a viewer, the views enabling autostereoscopic viewing of the 3D image data at a respective viewing position by engaging respective directional beams, and
wherein the viewer conflict detector is arranged for
- obtaining at least a second viewer position of a second viewer via the viewer detector,
- detecting a viewer position beam conflict where one view at the first viewer position coincides with one view at said second viewer position.

The effect of the sequential views, each being targeted at a respective eye of the viewer, is that the viewer perceives the 3D effect without any glasses, and also at the full resolution of the display. The viewer conflict detector now determines a first and a second viewer position, and if the left eye of the first user is at a position where it receives the same view as the right eye of the second user, the sequential view display cannot direct different views to such eyes. Hence a viewer position beam conflict is detected if a specific view generated by one respective directional beam arrives at two different respective eyes.

Optionally, the viewer conflict detector is arranged for, when detecting the viewer position beam conflict, controlling the processor to provide the same image content to both the first view and second view to provide a 2D effect for either the first viewer or the second viewer, while providing the 3D effect for the other viewer of said first and second viewer.

Optionally, the processor is arranged for providing the 2D effect for either the first or second viewer based on at least one of:
- a preference as set by the first or second viewer for 3D or 2D mode;
- motion of the respective first or second viewer;
- distance from the 3D display of the respective first or second viewer.

Advantageously the viewer that has the preference, or a favorable position, or who is likely to be attentive to the 3D effect, will perceive the 3D effect, whereas the other user (e.g. temporarily) perceives the 2D effect.

Optionally, the processor is arranged for providing the 2D effect for either the first or second viewer based on age of the respective first or second viewer, the age being based on at least one of:
- identification of the respective viewer and respective viewer data;
- detection of face characteristics;
- detection of inter eye distance;
- detection of relative sizes of the face of the first viewer and the face of the second viewer as detected via the viewer detector.

The 3D effect is usually optimized for grown-up viewers. Children may have a less optimal or distorted 3D effect, and some parents prefer their children not to see the 3D effect. Advantageously, the system detects the age of the viewers, and selectively provides the 3D effect.

Optionally, the processor is arranged for generating at least three different sequential views and the sequential view display is arranged for consecutively emitting said three sequential views, both the first and second sequential views constituting a pair of a left view and a right view, and the second and third sequential views constituting a further pair of a left view and a right view, and
the viewer conflict detector is arranged for controlling the processor to provide the second sequential view as said coinciding view so that the first and second viewer perceive the 3D effect. The sequential view system may apply only two views, but a more flexible configuration is achieved by adding at least a third view, so that said pairs of view are constituted. Advantageously, the system may provide viewers at beam conflict positions with respective different pairs of views, while sharing the second view with a respective left and right eye. Hence both viewers will experience the 3D effect.

Optionally, the viewer detector is arranged for detecting the viewer position of a viewer in front of the 3D display based on at least one of
- face detection in a video image from a camera;
- distance information from a distance sensor;
- user input from a remote control unit as operated by a viewer at the viewer position;
- detecting a viewer tagging object positioned by the viewer at the viewer position.

The viewer detector may determine the position of the viewer in horizontal, i.e. angular, direction, but also in distance for determining the views that arrive at the respective eyes of that viewer. The viewer detector may include a distance sensor, e.g. based on sound or infrared light. Such a sensor may also provide both distance and angular data of viewers. Also the user may activate or position a remote control unit at his viewing position, or he may define a predetermined desired viewing position. Also the viewer may position a tagging object, e.g. wearing a visually detectable object around his neck, to enable the viewer detector to accurately and reliably detect the eye position of that viewer.

In a further aspect of the invention, a method is provided of processing 3D image data for a display device, the device comprising a 3D display for emitting at least two views of 3D image data, the views enabling autostereoscopic viewing of the 3D image data at multiple viewing positions by a viewer perceiving a first view of said at least two views via the left eye and a second view of said at least two views via the right eye to provide a 3D effect, and a viewer detector for detecting a viewer position of a viewer in front of the 3D display, the method comprising processing the 3D image data for generating the at least two views for display on the 3D display wherein the method further comprises a step of detecting a viewer conflict by obtaining at least a first viewer position of a first viewer via the viewer detector, detecting a viewer position conflict at the first viewer position where said first view and second view do not provide the 3D effect for the first viewer, and controlling generating the views in dependence of the detected viewer position conflict by modifying at least one of said at least two views as received by the first viewer.

In a further aspect of the invention, a computer program is provided comprising instructions for causing a processor system to perform the method set forth. The computer program may be embodied on a computer readable medium.

According to the invention, the 3D image data that is processed is displayable on a 3D display for emitting a series of views of the 3D image data, e.g., an autostereoscopic multi-view 3D display. As such, the 3D image data may be so-termed multi-view image data comprising image data for each view. Such 3D image data may be directly displayed on the autostereoscopic multi-view display. Alternatively, the 3D image data may be stereo image data comprising image data for a left view and a right view, or two-dimensional [2D] image data plus depth data. Such 3D image data may need to be processed to obtain the series of views. For that purpose, the 3D display may employ so-termed view interpolation in case of stereo image data, or so-termed view rendering in case of 2D image data plus depth data. It will be appreciated that the above techniques are known from the field of 3D image/video processing, and in particular the field of 3D image/video conversion.

Such a 3D display emits the series of views, either sequentially or in the form of a spatial viewing cone, i.e., using directional beams or as a sequence of views that originate in a cone-shaped manner from a display plane of the 3D display, i.e. from a plane formed by a light emitting surface of the 3D display. For example, the viewing cone of a five-view autostereoscopic 3D display may comprise an outermost left view, an intermediate left view, a middle view, an intermediate right view, and an outermost right view. The viewer obtains stereoscopic viewing of the 3D image data when positioned at a viewing position perceiving two different ones of the series of views, e.g., when perceiving the outermost left view with the left eye and the intermediate left view with the right eye, or the middle view with the left eye and the intermediate right view with the right eye. Thus, the 3D display provides stereoscopic display at multiple viewing positions.

It will be appreciated by those skilled in the art that two or more of the above-mentioned embodiments, implementations, and/or aspects of the invention may be combined in any way deemed useful.

Modifications and variations of the device, the 3D image data, the method, and/or the computer program, which correspond to the described modifications and variations of the device and/or the 3D image data, can be carried out by a person skilled in the art on the basis of the present description. Further preferred embodiments of the device and method according to the invention are given in the appended claims, disclosure of which is incorporated herein by reference.

BRIEF DESCRIPTION OF THE DRAWINGS

These and other aspects of the invention are apparent from and will be elucidated with reference to the embodiments described hereinafter. In the drawings.

The Figures are purely diagrammatic and not drawn to scale. In the Figures, elements which correspond to elements already described have the same reference numerals.

DETAILED DESCRIPTION OF EMBODIMENTS

Figure 1:
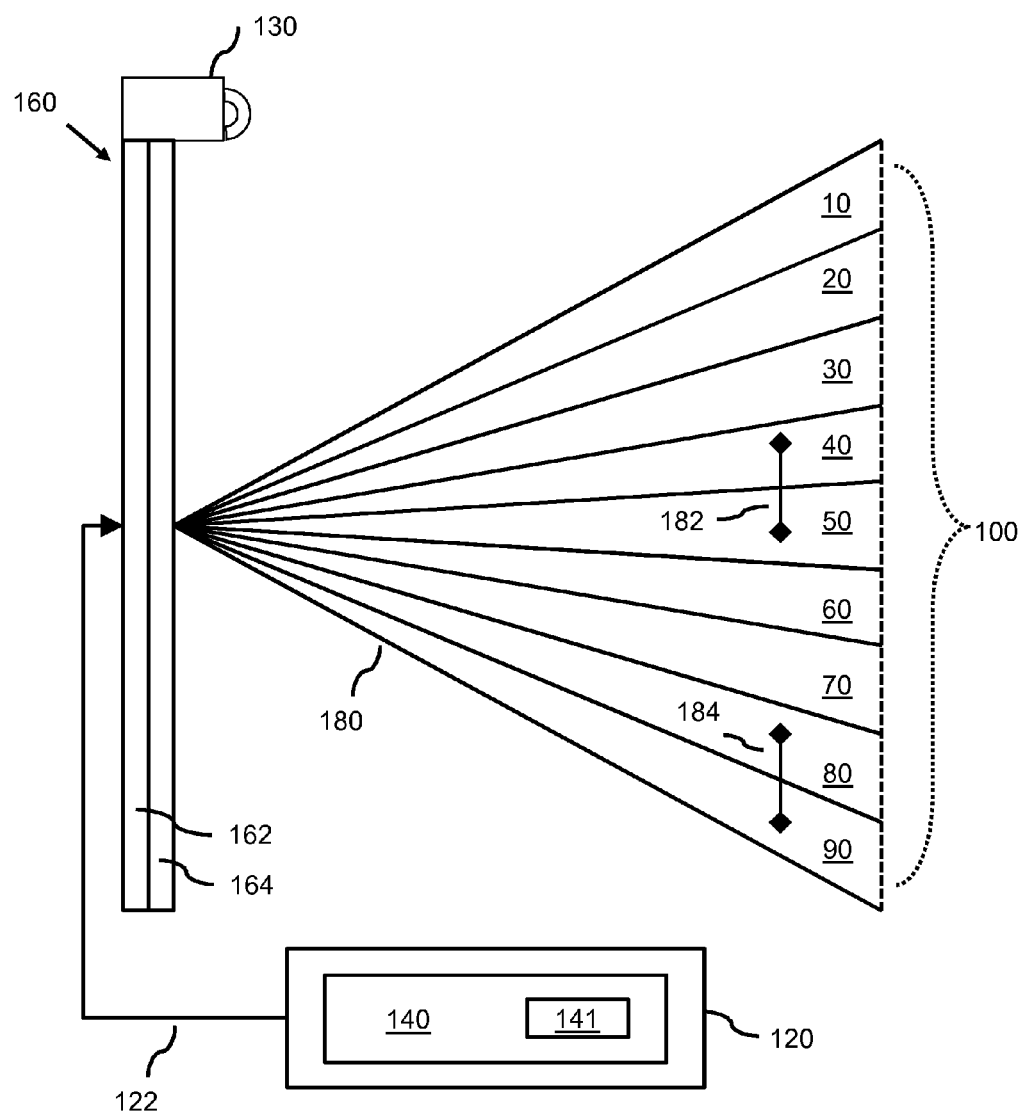
FIG. 1 shows a device for processing 3D image data and a 3D display for displaying the 3D image data and a viewer conflict detector.

FIG. 1 shows a device 120 for processing 3D image data 122. The device comprises a 3D display 160 for emitting at least two views of three-dimensional [3D] image data. The views enable autostereoscopic viewing of the 3D image data at multiple viewing positions 182, 184 by a viewer perceiving a first view of said at least two views via the left eye and a second view of said at least two views via the right eye to provide a 3D effect. It is noted that, at less favorite positions, views might overlap, and an eye may receive contributions from different views, causing so called cross-talk.

The 3D image data 122 may be stereo image data having a left view and a right view, or so-termed multi-view image data, i.e., comprising image data for each, or a subset, of the series of views 100. Although not shown in FIG. 1, the device 120 may, for that purpose, comprise a view renderer for generating the 3D image data 122 from, e.g., 2D image data plus depth data or from stereo image data. The view renderer may be a view renderer as described in WO1997/023097-A3.

The 3D display 160 may be an autostereoscopic 3D display, and is shown in FIG. 1 as a combination of a display layer 162 and an optical layer 164. The display layer 162 may be, e.g., a Liquid Crystal Display (LCD) layer, or an Organic Light Emitting Diode (OLED) layer. The optical layer, e.g. a lenticular lens, provides multiple views in at least one viewing cone.

The optical layer 164 may be so-termed lenticular lens array layer, or a parallax barrier layer. These and other examples of optical layers are known in the field of autostereoscopic 3D displays. The display layer 162 and the optical layer 164 cooperate to adjacently emit, in a viewing cone 180, a series of views 100 of the 3D image data 122. FIG. 1 shows a single viewing cone 180 being emitted from a center of the 3D display 160. It will be appreciated, however, that the display layer 162 and the optical layer 164 cooperate to emit the viewing cone from a plurality of locations located across a display plane of the 3D display 160. For example, when the optical layer 164 comprises a plurality of micro lenses, each of the plurality of micro lenses may emit a viewing cone identical or similar to the viewing cone 180. For sake of explanation, however, FIG. 1 only shows a single viewing cone.

The viewing cone 180 comprises the series of views 100. FIG. 1 shows a top-down view of the 3D display 160 and the viewing cone 180. Thus, the series of views 100 comprises a right-most view 10 up-to a left-most view 90. Each of the series of views 100 is shown to be approximately evenly distributed within the viewing cone 180, i.e., being emitted at an approximately equal solid angle with respect to an origin of the viewing cone 180. It will be appreciated, however, that other suitable distributions of the series of views 100 within the viewing cone 180 may be equally possible. Note that the assignment of what is the right most view is a choice. As such the location of the cone transition depends on the rendering of the respective views in corresponding pixels.

A viewer, positioned in space before the 3D display 160, may obtain autostereoscopic viewing of the 3D image data 122 by observing any two different ones of the series of views 100, with a left eye of the viewer observing a left view of said two views and a right eye of the viewer observing a right view of said two views. This provides multiple viewing positions within the viewing cone 180 at which autostereoscopic viewing is provided. It will be appreciated, however, that a 3D display 160 may optimized for providing autostereoscopic viewing to a viewer perceiving two adjacent ones of the series of views instead of any two different ones.

Alternatively the 3D display may be a sequential display, also known as a light steering display, which directs light beams to the respective eyes of a viewer, as elucidated later. For a light steering system the back unit 162 consists of a light steering backlight generating directional beams of light and the front panel 164 is the LCD panel. In such device optics are behind the LCD layer.

Hence, for sake of explanation, the invention will henceforth be explained for viewing positions where the viewer perceives said two adjacent ones of the series of views, or respective sequential views.

FIG. 1 shows two examples of viewing positions, i.e., a central viewing position 182 located near a central axis of the viewing cone 180, and an outermost viewing position 184 located near a side or border of the viewing cone 180. At both these viewing positions, the viewer perceives two adjacent ones of the series of views.

It is noted, that the term viewing position is understood to refer to all the positions in which two adjacent ones of the series of views can be perceived. Thus, e.g., the central viewing position 182 is understood to refer to all positions that the viewer can assume within the viewing cone 180 in which a left eye perceives a view 50 of the series of views 100 and a right eye perceives a view 40 of the series of views 100.

The device has a processor 140 for processing the 3D image data for generating said at least two views for display on the 3D display. The device further has a viewer detector 130 for detecting a viewer position of a viewer in front of the 3D display. The viewer detector may include a camera for acquiring an image of the space in front of the 3D display, and may include detector software for processing the image and detecting faces of the viewers. Other head tracking systems may also be used, and are known as such.

The processor 140 further comprises a viewer conflict detector 141 arranged for detecting and resolving a viewer conflict. First the unit obtains at least a first viewer position of a first viewer via the viewer detector 130. Then the unit detects a viewer position conflict at the first viewer position where said first view and second view do not provide the 3D effect for the first viewer. Finally the unit controls generating the views by processor 140 in dependence of the detected viewer position conflict. Thereto the unit modifies at least one of said at least two views as received by the first viewer.

Figure 2:
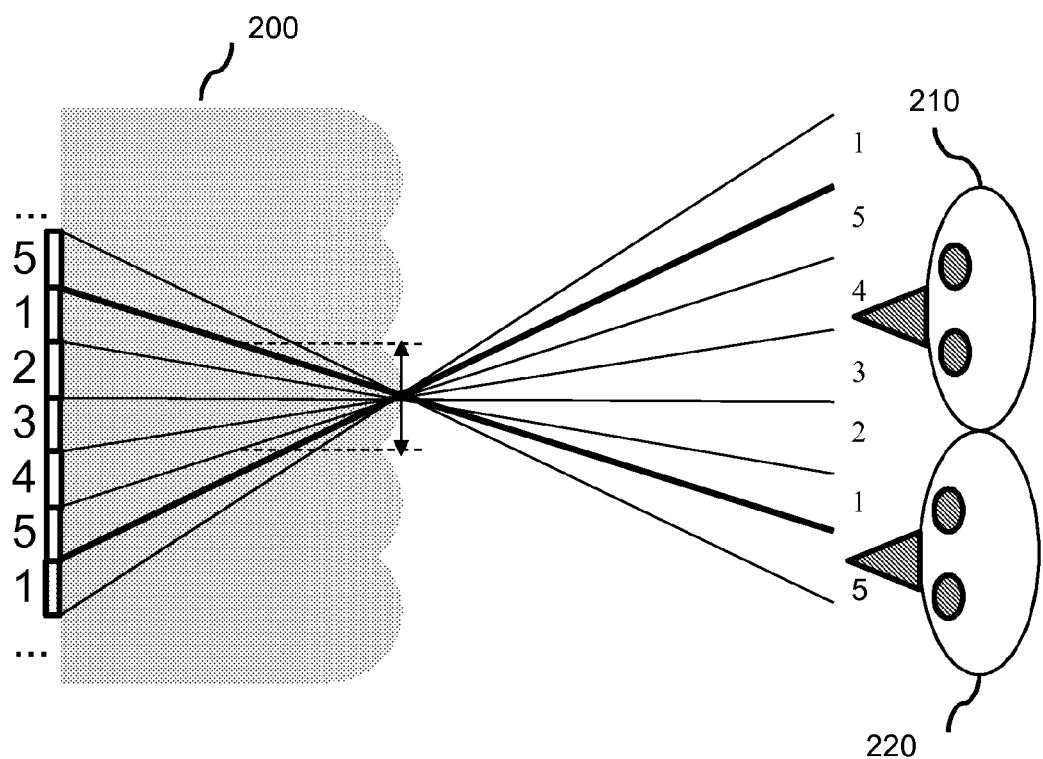
FIG. 2 shows a 3D display and two viewers in top view.

FIG. 2 shows a 3D display and two viewers in top view. The 3D display 200 has an array of pixels, e.g. an LCD, having 5 cooperating sub-pixels to provide 5 views in a viewing cone, the sub-pixels and views being numbered 1-5. The viewing cone is repeated, a second viewing cone being indicated at the bottom of the first viewing cone by the repeated view 5 in a gray number. Hence, if both eyes of a viewer are within a single cone the viewer sees good stereoscopic 3D. If one eye is outside the main cone, and in a further cone, the viewer sees bad 3D (pseudoscopic view, also called anti-stereo).

So if a viewer moves in horizontal direction he will perceive different sets of adjacent views. The viewer positions are detected by a viewer detector (not shown) and are assumed to be known in the system relative to the positions of the viewing cones. A first viewer 210 is detected to receive views 3 and 4 of the first viewing cone, which provides a correct 3D effect. A second viewer 220 is detected to receive view 1 of the first viewing cone and view 5 of the second viewing cone, which provides a pseudoscopic, incorrect 3D effect.

When viewing auto-stereoscopic 3D TVs there are positions in front of the TV that provide good 3D (stereo) and bad 3D (anti-stereo), also called pseudoscopic or incorrect 3D effect. While watching a movie viewers tend to move somewhat and can move (partly) into an anti-stereo region. For the viewer it is not always obvious that the viewing position is not perfect, which can cause eyestrain or worse. Therefore it is proposed to provide active feedback to the viewer when the viewing position is incorrect. However other viewers, which are in a correct viewing position, should not get this feedback. It is proposed to detect when one viewer is located or moves into an anti-stereo region and to provide feedback cues in the image to indicate to the viewer that he cannot receive the correct 3D effect. In the example the position of the second viewer 220 has a conflict because he receives the outer two views of two different viewing cones. An indication is proposed that affects only those viewers at the boundaries of the viewing cone and not those already sitting in the middle of the cone.

Figure 3:
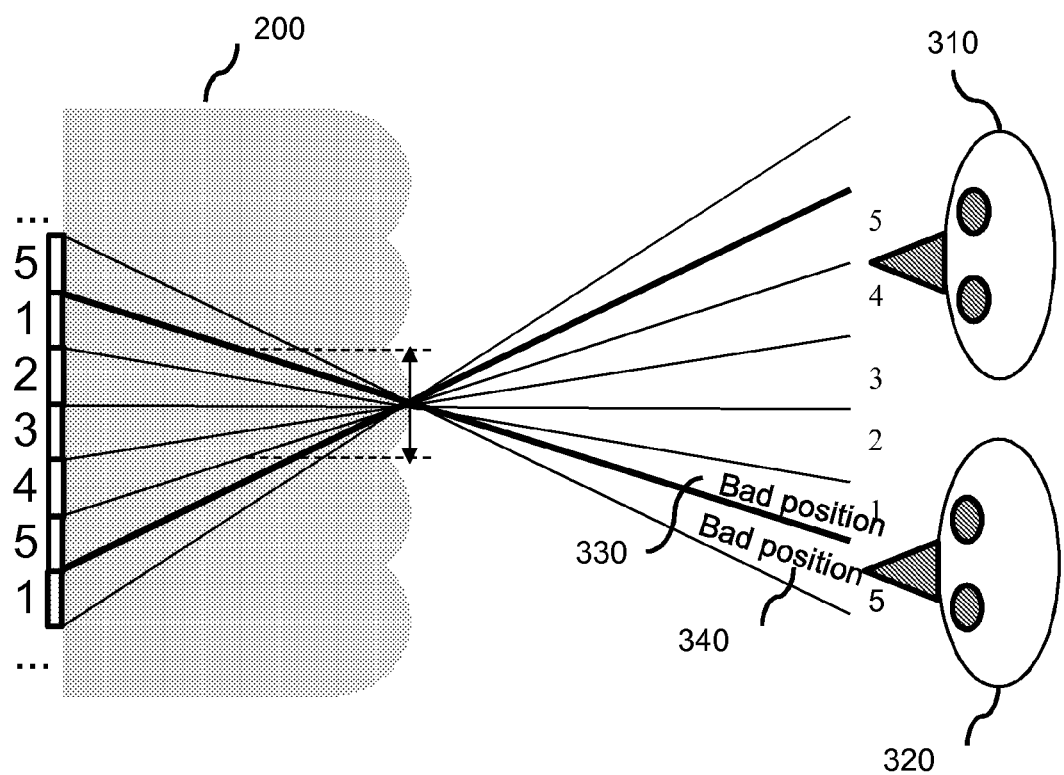
FIG. 3 shows an indication of a viewer position conflict.

FIG. 3 shows an indication of a viewer position conflict. The Figure has a similar 3D display as shown in FIG. 2. A first viewer 310 is detected to receive views 4 and 5 of the first viewing cone, which provides a correct 3D effect. A second viewer 320 is detected to receive view 1 of the first viewing cone and view 5 of the second viewing cone, which provides a pseudoscopic, incorrect 3D effect. Hence the second viewer has a viewer position conflict. The system now generates a warning message 330, e.g. a text "Bad position" or a similar warning, or a graphical warning symbol. The warning message is inserted in view 1 as long as the second viewer 320 is in the conflict position. Optionally, the system may also insert a second warning message, e.g. a second warning text 340, in the second view 5 that is perceived. However, the system first detects whether any of the views 1,5 which are perceived at the conflict position, are also perceived by at least one other viewer. In the example, the first viewer 310 also perceives view 5. So the system only generates and inserts the first warning message 330 in view 1. If however the first viewer received views 3 and 4 as shown in FIG. 2, both warning messages are inserted in views 1 and 5 respectively.

Hence, if a viewer moves into the anti-stereo region a text message is superimposed on at least one of the images he perceives, in the example view 1 and 5. The warning is only visible to this viewer 320 and will urge him to move out of the anti-stereo region until he is in the center region of the cone (views 2-3-4). At that moment the text message is turned off and the viewer has full freedom of movement again from view 1 to 5 until he again crosses a cone boundary.

As explained above the text message or graphical symbol can be presented to only a single eye. For instance if a first viewer sees correct stereo via views 4,5 and the second viewer sees anti-stereo via views 5,1 then the text message could be displayed only in view 1, thereby not disturbing the first viewer.

Instead of a text message superimposed on the image there are also other options to give feedback to the viewer to move out of the anti-stereo zone. In an embodiment the colors of the image are modified, e.g. inverted. A color image may also be replaced by a black & white image. In a further embodiment the image content may be changed. For example a black screen or a red screen may be displayed temporarily as long as a viewer is at the viewer conflict position. A further alternative is to show a blinking text or symbol to draw most attention. For example, the symbol may be an overlay of an arrow indicating the preferred direction of movement to get rid of the conflict.

In an embodiment the viewer at a conflict position may be provided with a 2D image instead of a 3D image by generating two views having the same content. For example, in the example as shown in FIG. 3, the view 1 is only used by the right eye of the second viewer. So the content of view 1 may be copied from view 5. So both eyes of the second viewer will receive the same image, so a 2D (mono) effect will be perceived. The first viewer still receives the 3D effect, because views 4 and 5 are not affected.

Figure 4:
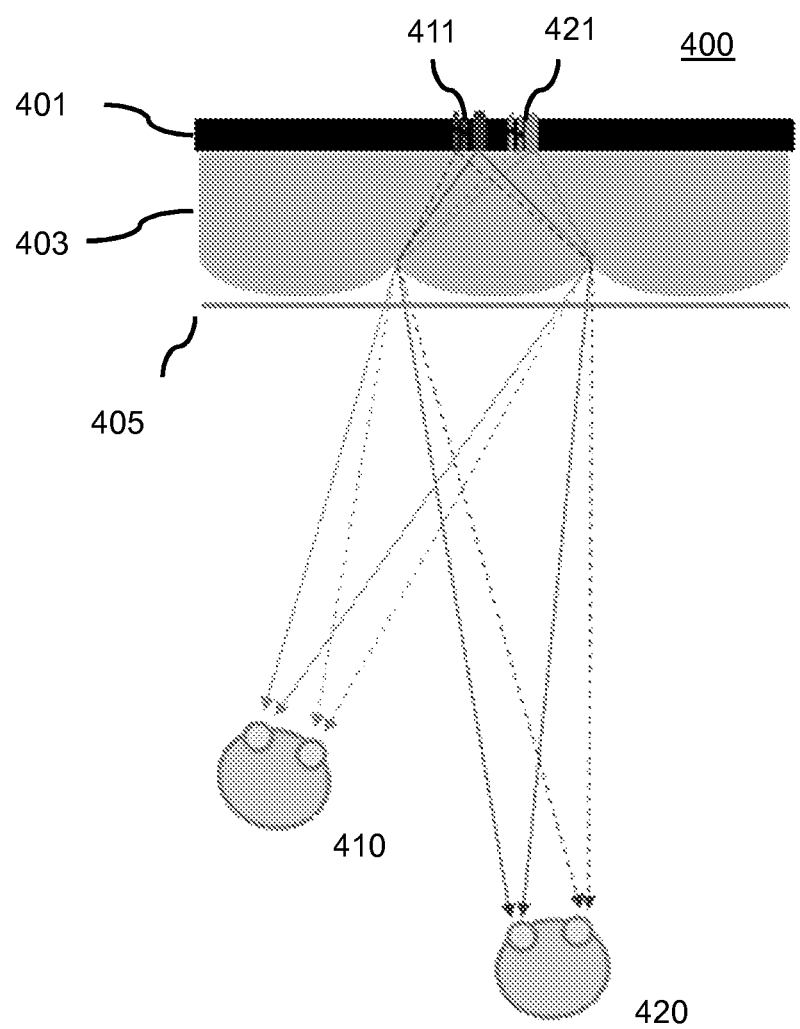
FIG. 4 shows an auto-stereoscopic display based on a light-steering backlight with multiple light sources.

FIG. 4 shows an auto-stereoscopic display based on a light-steering backlight with multiple light sources. In the display, in a backlight unit 401, light sources 411, 421 are located behind a lens 403, and each source corresponds to a specific direction. In front of the lens is a LCD image display 405. It is to be noted that a single lens may illuminate a large number of pixels in the LCD, whereas a directional beam is generated towards a specific left or right eye of a viewer. The LCD sequentially displays a left view and a right view. Several light sources may be activated during the time the left view is displayed to direct respective beams to the left eyes of the viewers. Corresponding light sources are activated when the display, at a next instant, displays the right view.

FIG. 4 illustrates the sequential, light steering system with two simultaneous viewers 410, 420. Both viewers are provided a stereo like 3D image by representing the left and right image time sequentially. Let us assume that the LCD has a refresh rate of 240 Hz. In that case the LCD would display the left-eye image $\frac{1}{120}$ second, as indicated by the solid lines from the light sources to the eyes. During this interval, the light sources corresponding to the left eye direction of observer 410 and 420 are flashed. In the next $\frac{1}{120}$ second, the right-eye image is displayed with the light sources corresponding to the right eye directions switched on, as indicated by the dashed lines from the light sources to the eyes. By time sequentially repeating this process, the observers see the left eye and a black frame in the right eye alternated at $\frac{1}{120}$ s with a black frame in the left eye and an image in the right eye.

The display in FIG. 4 uses spatial multiplexing of the light sources in the backlight to address different viewing directions. In the example, the spatial separation between the viewing direction is sufficient to provide both observers with stereo like quality 3D. However, if the right-eye of first observer 410 is located at the same angle as the left eye of second observer 420, then only one of the viewers can be served with stereo. At angles close to this situation, cross-talk may be visible by either or both viewers. As result it is virtually impossible to provide both observers with good stereo quality, simultaneously. Such position of two viewers is called a viewer position beam conflict.

There are different ways to deal with this situation. Without taking any precautions, both observers will experience an undesirable increase in cross-talk. To avoid poor quality it is proposed to switch at least one observer from stereoscopic to monoscopic view. This can be achieved by presenting only the left or only the right images of the stereo content. In other words, all backlight sources corresponding to both the left and right eye positions for both observers are switched on when showing the left (or right) images, while in the next field the corresponding right (or left) images are not shown by switching off the backlight sources.

Figure 5:
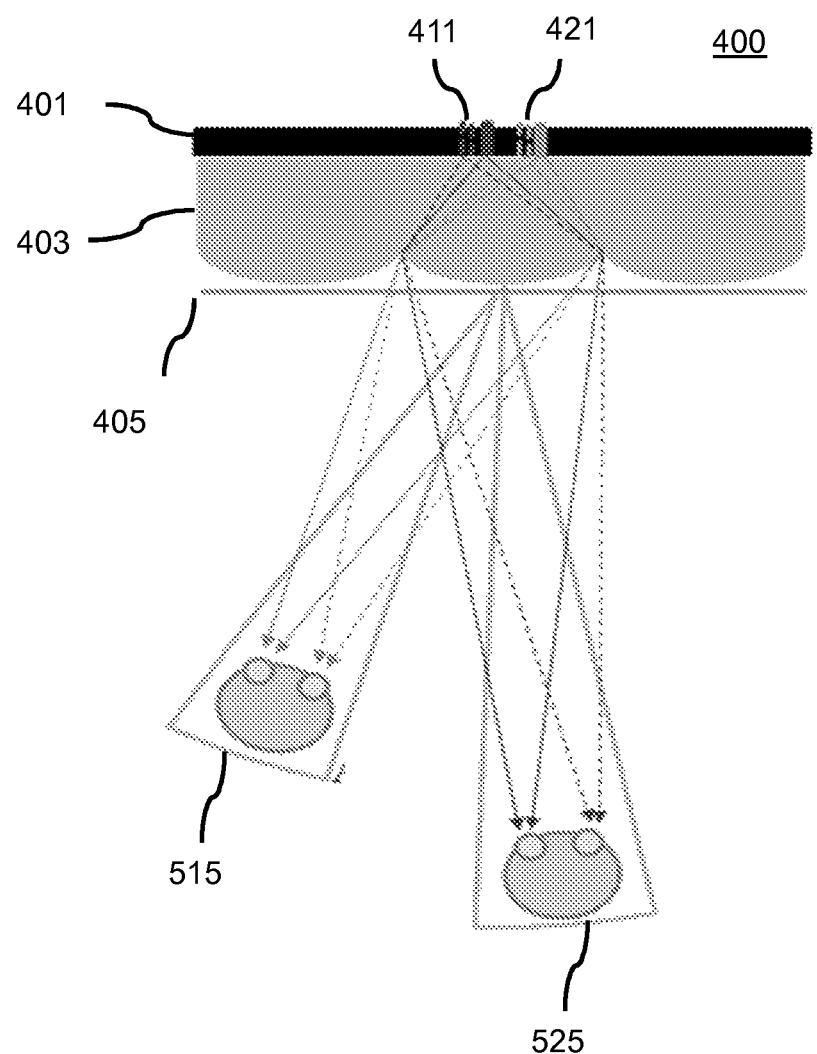
FIG. 5 shows collision zones for detecting a viewer position beam conflict.

FIG. 5 shows collision zones for detecting a viewer position beam conflict. The Figure shows a sequential type display similar to FIG. 4. Using a set of light sources 411,421 a respective directional light beam for a specific direction of a respective viewer at a specific viewing position can be generated. In the Figure respective viewing zones 515,525 have been indicated for representing the viewing position in which the corresponding directional beams can achieve the desired 3D effect. In the system according to this embodiment the viewer conflict detector is arranged for obtaining a first and at least a second viewer position of a second viewer via the viewer detector. The positions may be represented by the viewing zones 515,525. Subsequently the viewer conflict detector is arranged for detecting a viewer position beam conflict where one view at the first viewer position coincides with one view at said second viewer position. In the Figure the viewing zones of viewers at such conflicting viewing positions would partly overlap.

A way to determine whether or not to switch from stereoscopic to monoscopic view is to define fixed area viewing zones 515,525, or collision zones, around the observers. FIG. 5 illustrates the use of wedge shaped collision zones. The idea is to present both observers with stereo content as long as the collision areas to not overlap. When the areas overlap at least one or both observers are presented with monoscopic mode.

An extension of this embodiment is to account for the motion of the observers. Suppose that person B is sitting on the coach and not moving. Person A, on the other hand, is walking from left to right and a certain moment passing the viewing direction of B. In this case it makes sense to give B a higher priority in receiving a good image quality. The reasoning behind this is that there is a much higher change that B is watching the screen than A. Furthermore, a degradation of the image quality while moving probably seems acceptable. Finally it is technically more challenging to track moving people which makes a monoscopic fallback scenario attractive anyway. In a similar way other clues for attention can be used. In the case of the sitting and moving person it makes sense to prioritize on a segmentation of the vertical position, i.e. sitting versus standing.

In a further embodiment, if person A moves towards person B, but decides to not leave the collision zone of B again on short notice, both observers are switched to monoscopic view. Here one could think of person A sitting down next to B. In this case it would be undesirable that observer A remains to receive a cross-talk distorted image. This issue could be resolved by setting a threshold on a timer that registers the time that there is an overlap between collision zones. This time delay is also advantageous in making the system less sensitive to noise, which may otherwise introduce random frequent switching when persons are close to each other. When the persons move apart and there is no overlap in the collision zones, it makes sense to enable the stereoscopic mode again. To minimize the distraction introduced by switching it is proposed to wait for a scene transition. In addition to the timer, a scene transition may also be used to trigger the transition to the monoscopic mode, or back to stereoscopic mode.

Figure 6:
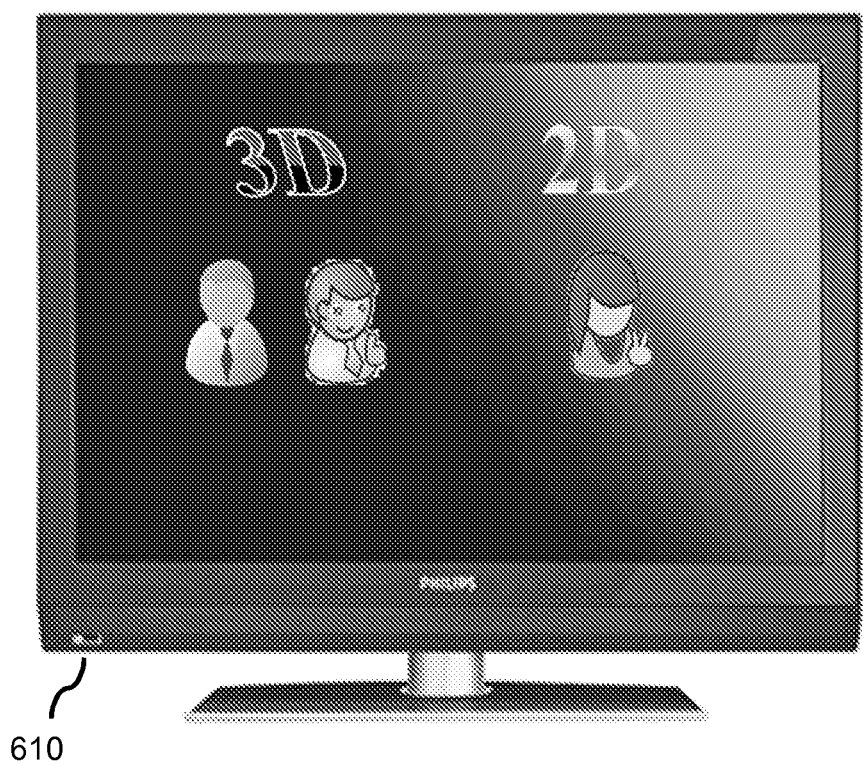
FIG. 6 shows a 3D display device and a viewer menu.

FIG. 6 shows a 3D display device and a viewer menu. The 3D display device 610 provides an example of a 3D television unit. On the display screen a menu is shown. The left side of the menu schematically shows two viewers that currently are selected to receive the image data in a 3D mode. The right side of the menu shows a viewer that currently is set to receive a 2D version of the image data. The menu may enable to change the settings for each viewer. The schematic representation of the menu enables to control observer specific 2D/3D settings. The TV shows a close up of all observers. With a remote control the observers can be divided into two groups.

The embodiment enables another type of interaction between observers which is their preference for 3D. By combining a head tracker unit with face recognition it is possible to distinguish between different observers. In this way it is for instance possible to present certain observers with a monoscopic image, while others receive stereoscopic content. FIG. 6 shows an example of an on screen menu which can be used to group the detected observers in a monoscopic and stereoscopic group. The same approach can be used to exclude e.g. children from watching in the stereoscopic 3D mode. As the observed depth for stereo like content decreases with the distance from the screen, it makes sense to switch to the monoscopic mode for observers that are too close to the screen. This may also be used if observers are too far away. In this case the angular separation between the eyes becomes so small that cross-talk cannot be avoided. Optionally, by using a faster display, it is also possible to include additional views rendered at a different depth. By selecting respective pairs of views for different viewers, it is possible to provide different amounts of depth for different observers. For example, the system may select an appropriate set of views for each individual viewer.

As described above, the situation that multiple viewers are located at the same lateral angle relative to the display is considered and enhanced. Further user specific 3D settings based on face recognition have been described.

The proposed system applies to the class of auto-stereoscopic displays that use head- or pupil tracking to deliver an image to the observers' left and right eye. More specifically an embodiment is the class of auto-stereoscopic displays that use backlight light steering to direct light into each of the eyes. An example configuration is to use multiple switchable light sources behind a lens array to steer the light. Examples of such displays are discussed in the document: "Technical solutions for a full-resolution auto-stereoscopic 2D/3D display technology; by Hagen Stolle, Jean-Christophe Olaya, Steffen Buschbeck, Hagen Sahm, Dr. Armin Schwerdtner from SeeReal Technologies GmbH (Germany)" available at http://www.seereal.biz/en/autostereoscopy/papers/ EI08%206803-24%20Web.pdf. A head tracker is used to establish the position, or directions, of the viewers relative to the screen. By addressing the proper light sources, light is steered to either the left of right eye. In this way it is possible to time-sequentially offer a stereo like 3D-image to the viewers. A further example of view sequential 3D displays is described in the document "The design of backlights for view-sequential 3D; by Travis, N. Emerton, T. Large, S. Bathiche" available at http://download.microsoft.com/ download/D/2/E/425F8-CF3C-4C71-A4A2- 70F9D4081007/Backlightforviewsequentialautostereo.docx By spatial multiplexing of the light sources, light steering can be used to serve multiple viewers simultaneously with a stereo like 3D image. This is at least possible if the viewers are located in clearly separable directions relative to the screen. However if the directions to the observers become too similar it is no longer possible to address the left and right eyes individually. More specifically, light meant for the right eye of one observer will start to spatially overlap with that of the left eye of the other observer, or vice versa. This will introduce "cross-talk" and hence a degradation of the 3D performance. In the worst case one of the observers sees anti-stereo.

Another type of interaction that has been identified for the case of multiple viewers is their preference for either 2D or 3D watching. Stereoscopy does not address all visual cues available in the real world. Conflicts between different depth cues may result in visual discomfort. Since some people are more sensitive to this than others, their preference for 3D might differ. Also artifacts introduced by the system may lead to a different preference. Finally, the depth perception per person will depend on their distance to the screen. Observers close to the screen may perceive more depth than desired.

As it is impossible to achieve a good 3D performance for viewers at all arbitrary locations by the same projection, the above described system detects conflicting positions and subsequently provides some of the observers in the same direction with a monoscopic view or warning signals. Conflicts between different preferences to watch content in 2D or 3D can be resolved by coupling the head tracking to a face recognitions scheme.

Figure 7:
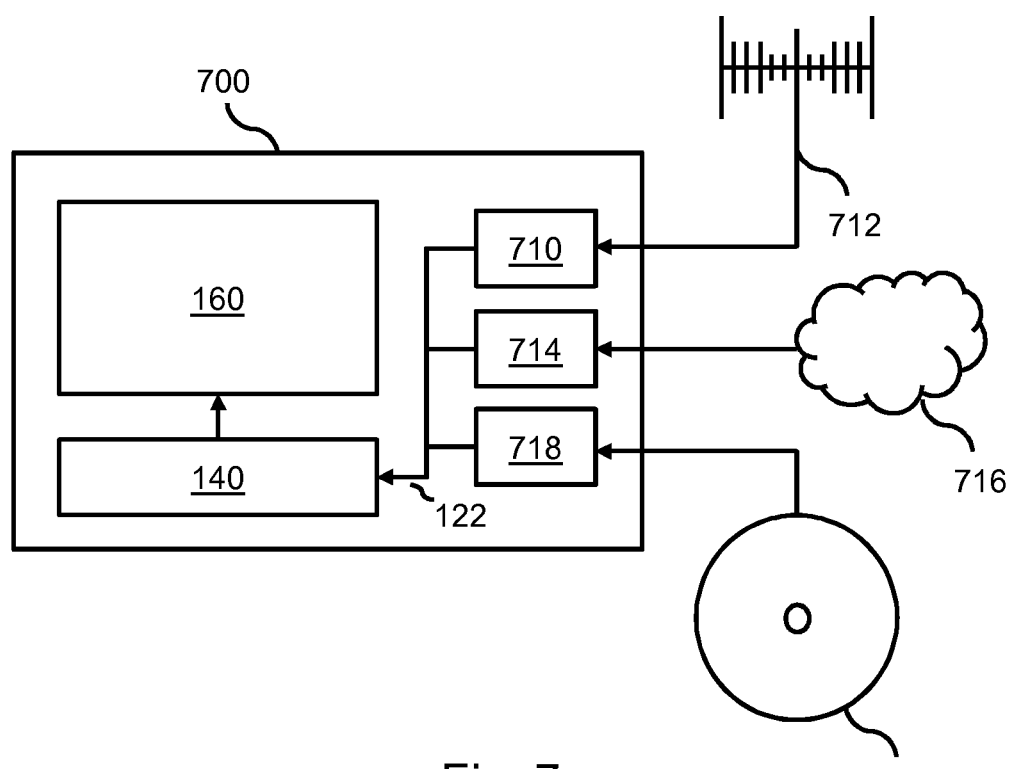
FIG. 7 shows a device comprising a 3D display, a broadcast receiver, an internet receiver, a storage medium and a storage medium reader.

FIG. 7 shows a device 700 comprising a 3D display 160 for displaying the 3D image data 122, a broadcast receiver 710 for receiving the 3D image data from a broadcast transmission 712, an internet receiver 714 for receiving the 3D image data from internet 716 and a storage medium reader 718 for reading the 3D image data from a storage medium 720. It will be appreciated, however, that the device 700 may, instead of comprising all of the aforementioned components, comprise only a subset of said components. The device 700 may be, e.g., a 3D television comprising a lenticular-based multi-view 3D display 160. The device 700 may also include e.g. a Blu-ray player, a Blu-ray recorder, a set-top box, personal computer, hard-disk recorder etc. Although not shown in FIG. 7, the device 700 may comprise user input means for allowing a user to instruct the viewer conflict detector 140 to either turn on or turn off the detection of viewer conflicts, or to set any other user preference. The user input means may be a remote control signal receiver for allowing the user to instruct the viewer conflict detector 140 using a remote control.

The broadcast receiver 710 may be of any suitable type, e.g. for receiving terrestrial, satellite or cable broadcasts. The internet receiver 714 may also be of any suitable type, and may include modem functionality as required by e.g. ADSL, Ethernet, WLAN, UMTS etc, or be an interface protocol, e.g. TCP/IP. The storage medium reader 718 may be of any suitable type for reading 3D image data 122 from a storage medium 720, the storage medium 720 being of any suitable type, e.g. Blu-ray, DVD, flash-memory, ROM, RAM etc. The storage medium may store a computer program which, when loaded in the device, performs a method for viewer conflict detection as described above.

Figure 8:
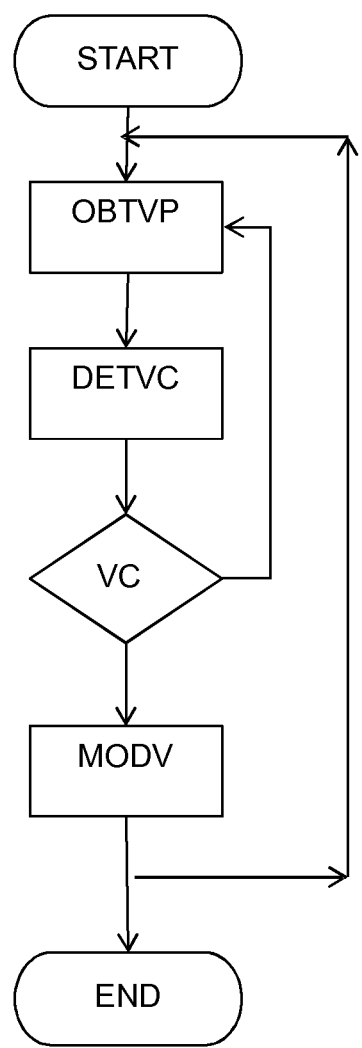
FIG. 8 shows a method of detecting viewer conflicts.

FIG. 8 shows a method of detecting viewer conflicts. The method starts at START and processes 3D image data for a 3D display device as described above. The device has a viewer detector for detecting a viewer position of a viewer in front of the 3D display. The method continually processes the 3D image data for generating the at least two views for display on the 3D display. The method further comprises steps for detecting a viewer conflict. The detecting starts with a step OBTVP of obtaining at least a first viewer position of a first viewer via the viewer detector. Next a step DETVC detects a viewer position conflict at the first viewer position where said first view and second view do not provide the 3D effect for the first viewer. If no viewer conflict is detected at decision step VC, the method continues obtaining viewer positions at step OBTVP. If a viewer conflict is detected at decision step VC, the method continues by modifying at least one of the views at step MODV, by modifying at least one of said at least two views as received by the first viewer. If no further 3D image needs to be provided the method terminates at step END. It is noted that, when a view has been previously modified, and the method detects that the previous viewer conflict no longer exists, the previous modification is removed.

It will be appreciated that the above description for clarity has described various embodiments of the invention with reference to different functional units. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. A display device, comprising:
   a 3D display configured to emit at least two views of three-dimensional image data, the views enabling autostereoscopic viewing of the 3D image data at multiple viewing positions by a viewer perceiving a first view of said at least two views via the left eye and a second view of said at least two views via the right eye to provide a 3D effect,
   a processor configured to process the 3D image data and configured to generate the at least two views for display on the 3D display, and
   a viewer detector configured to detect a viewer position of a viewer in front of the 3D display, wherein the processor further comprises
   a viewer conflict detector configured to
      obtain at least a first viewer position of a first viewer via the viewer detector,
      detect a viewer position conflict at the first viewer position where said first view and second view do not provide the 3D effect for the first viewer, and
      control generation of the views based on the detected viewer position conflict by modifying at least one of said at least two views as received by the first viewer;
   wherein the 3D display is a sequential view display arranged for consecutively emitting a left view and a right view via a respective first directional beam to the left eye and a respective second directional beam to the right eye of a viewer, the views enabling autostereoscopic viewing of the 3D image data at a respective viewing position by engaging respective directional beams, and wherein the viewer conflict detector is configured to
obtain at least a second viewer position of a second viewer via the viewer detector, and
detect a viewer position beam conflict where one view at the first viewer position coincides with one view at said second viewer position.

2. The device as claimed in claim 1, wherein the viewer conflict detector is configured to, when detecting the viewer position beam conflict, control the processor to provide the same image content to both the first view and second view to provide a 2D effect for either the first viewer or the second viewer, while providing the 3D effect for the other viewer of said first and second viewer.

3. The device as claimed in claim 2, wherein the processor is configured to provide the 2D effect for either the first or second viewer based on at least one of:
a preference as set by the first or second viewer for 3D or 2D mode;
motion of the respective first or second viewer;
distance from the 3D display of the respective first or second viewer.

4. The device as claimed in claim 2, wherein the processor is configured to provide the 2D effect for either the first or second viewer based on age of the respective first or second viewer, the age being based on at least one of:
identification of the respective viewer and respective viewer data;
detection of face characteristics;
detection of inter eye distance;
detection of relative sizes of the face of the first viewer and the face of the second viewer as detected via the viewer detector.

5. The device as claimed in claim 1, wherein the processor is configured to generating generate at least three different sequential views and the sequential view display is arranged for consecutively emitting said three sequential views, both the first and second sequential views constituting a pair of a left view and a right view, and the second and third sequential views constituting a further pair of a left view and a right view, and
the viewer conflict detector is configured to control arranged for controlling the processor to provide the second sequential view as said coinciding view so that the first and second viewer perceive the 3D effect.

6. The device as claimed in claim 1, wherein the viewer detector is configured to detect the viewer position of a viewer in front of the 3D display based on at least one of
face detection in a video image from a camera;
distance information from a distance sensor;
user input from a remote control unit as operated by a viewer at the viewer position;
detecting a viewer tagging object positioned by the viewer at the viewer position.

7. A method of processing 3D image data for display on a 3D display for emitting at least two views of three-dimensional image data, the views enabling autostereoscopic viewing of the 3D image data at multiple viewing positions by a viewer perceiving a first view of said at least two views via the left eye and a second view of said at least two views via the right eye to provide a 3D effect, wherein the 3D display is a multiple view display arranged for adjacently emitting, in a viewing cone, a series of more than two views of the 3D image data, the series of views enabling autostereoscopic viewing of the 3D image data at multiple viewing positions in the viewing cone, the method comprising:
processing the 3D image data for generating the at least two views for display on the 3D display;
detecting a viewer position of a viewer in front of the 3D display;
obtaining at least a first viewer position of a first viewer via the viewer detector;
detecting a viewer position conflict at the first viewer position where said first view and second view do not provide the 3D effect for the first viewer;
generating the views based on the detected viewer position conflict by modifying at least one of said at least two views as received by the first viewer;
detecting a viewer position cone conflict; and
when the viewer position cone conflict is detected at the first viewer position, where said first view is a first cone view from a first cone and the second view is a second cone view from a second cone, modifying at least one of the first cone view and the second cone view by at least one of,
overlaying a graphical element on the respective cone view;
overlaying a text message on the respective cone view; and
changing image content of the respective cone view by temporarily showing a black screen or a red screen.

8. The method as claimed in claim 7, wherein said modifying further changes at least one of said at least two views for indicating that the 3D effect is not provided.

9. The method as claimed in claim 7, wherein when the viewer position cone conflict is detected at the first viewer position, modifying at least one of the first cone view and second cone view so as to
provide the same image content to both the first cone view and second cone view to generate a 2D effect for the viewer.

10. The method as claimed in claim 7, wherein when a viewer position cone conflict is detected at the first viewer position, further modifying at least one of the first cone view and second cone view by at least one of
changing brightness of the respective cone view; and
changing color of the respective cone view.

11. The method as claimed in claim 7, further comprising
obtaining at least a second viewer position of a second viewer,
when the viewer position cone conflict is detected at the first viewer position, selecting one of the first cone view and second cone view such that the selected cone view is not a view perceived by the second viewer, and
modifying only the selected cone view.

12. A display device, comprising:
a 3D display configured to emit at least two views of three-dimensional image data, the views enabling autostereoscopic viewing of the 3D image data at multiple viewing positions by a viewer perceiving a first view of said at least two views via the left eye and a second view of said at least two views via the right eye to provide a 3D effect,
a processor configured to process the 3D image data and configured to generate the at least two views for display on the 3D display, and
a viewer detector configured to detect a viewer position of a viewer in front of the 3D display,
wherein the processor further comprises:
a viewer conflict detector configured to obtain at least a first viewer position of a first viewer via the viewer detector, detect a viewer position conflict at the first viewer position where said first view and second view do not provide the 3D effect for the first viewer, and control generation of the views based on the detected viewer position conflict by modifying at least one of said at least two views as received by the first viewer;

wherein the 3D display is a multiple view display arranged for adjacently emitting, in a viewing cone, a series of more than two views of the 3D image data, the series of views enabling autostereoscopic viewing of the 3D image data at multiple viewing positions in the viewing cone, and wherein the viewer conflict detector is configured to detect a viewer position cone conflict at the first viewer position where said first view is a first cone view from a first cone and the second view is a second cone view from a second cone; and when the viewer position cone conflict is detected, control the processor to modify at least one of the first cone view and second cone view by at least one of:

overlaying a graphical element on the respective cone view;

overlaying a text message on the respective cone view; and changing image content of the respective cone view by temporarily showing one of a black screen and a red screen.

13. The device as claimed in claim 12, wherein the processor is configured to modify at least one of said at least two views as received by the first viewer by changing at least one of said at least two views for indicating that the 3D effect is not provided.

14. The device as claimed in claim 12, wherein when detecting the viewer position cone conflict, the viewer conflict detector is configured to control the processor to modify at least one of the first cone view and second cone view so as to provide the same image content to both the first cone view and second cone view to generate a 2D effect for the viewer.

15. The device as claimed in claim 12, wherein when detecting the viewer position cone conflict, the viewer conflict detector is configured to control the processor to modify at least one of the first cone view and second cone view by at least one of:

changing brightness of the respective cone view; and changing color of the respective cone view.

16. The device as claimed in claim 12, wherein the viewer conflict detector is configured to obtain at least a second viewer position of a second viewer via the viewer detector, and when the viewer cone position conflict is detected, select one of the first cone view and second cone view such that the selected cone view is not a view perceived by the second viewer, control the processor to modify only the selected cone view.

17. The device as claimed in claim 12, wherein the viewer detector is configured to detect the viewer position of a viewer in front of the 3D display based on at least one of:

face detection in a video image from a camera;

distance information from a distance sensor;

user input from a remote control unit as operated by a viewer at the viewer position;

detecting a viewer tagging object positioned by the viewer at the viewer position.

\* \* \* \* \*